Aug. 6, 1935.  G. F. HOCHRIEM  2,010,487
GAME APPARATUS
Filed June 22, 1932  8 Sheets-Sheet 1

Inventor:

Gustav F. Hochriem,

By Sturtevant, Mason & Porter
Attorneys.

Aug. 6, 1935.  G. F. HOCHRIEM  2,010,487
GAME APPARATUS
Filed June 22, 1932  8 Sheets-Sheet 2

Inventor:
Gustav F. Hochriem,
By Sturtevant, Mason & Porter
Attorneys

Aug. 6, 1935.  G. F. HOCHRIEM  2,010,487
GAME APPARATUS
Filed June 22, 1932  8 Sheets-Sheet 3
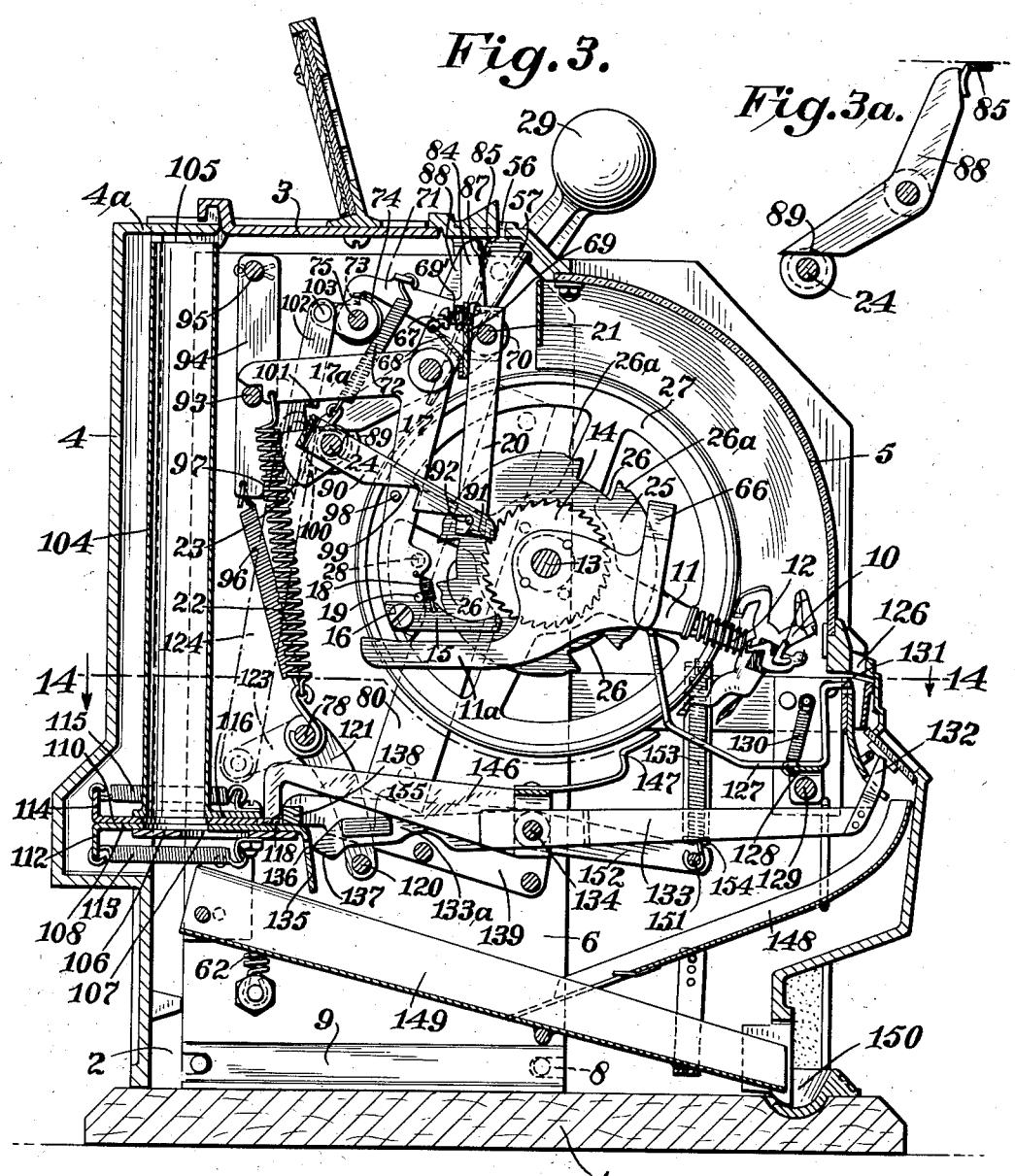
Fig.3.
Fig.3a.
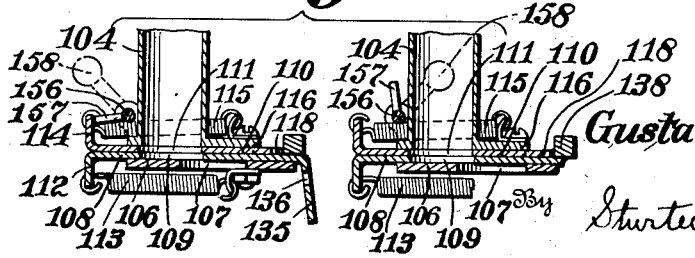
Fig.19.
Inventor:
Gustav F. Hochriem,
By Sturtevant, Mason & Porter
Attorneys

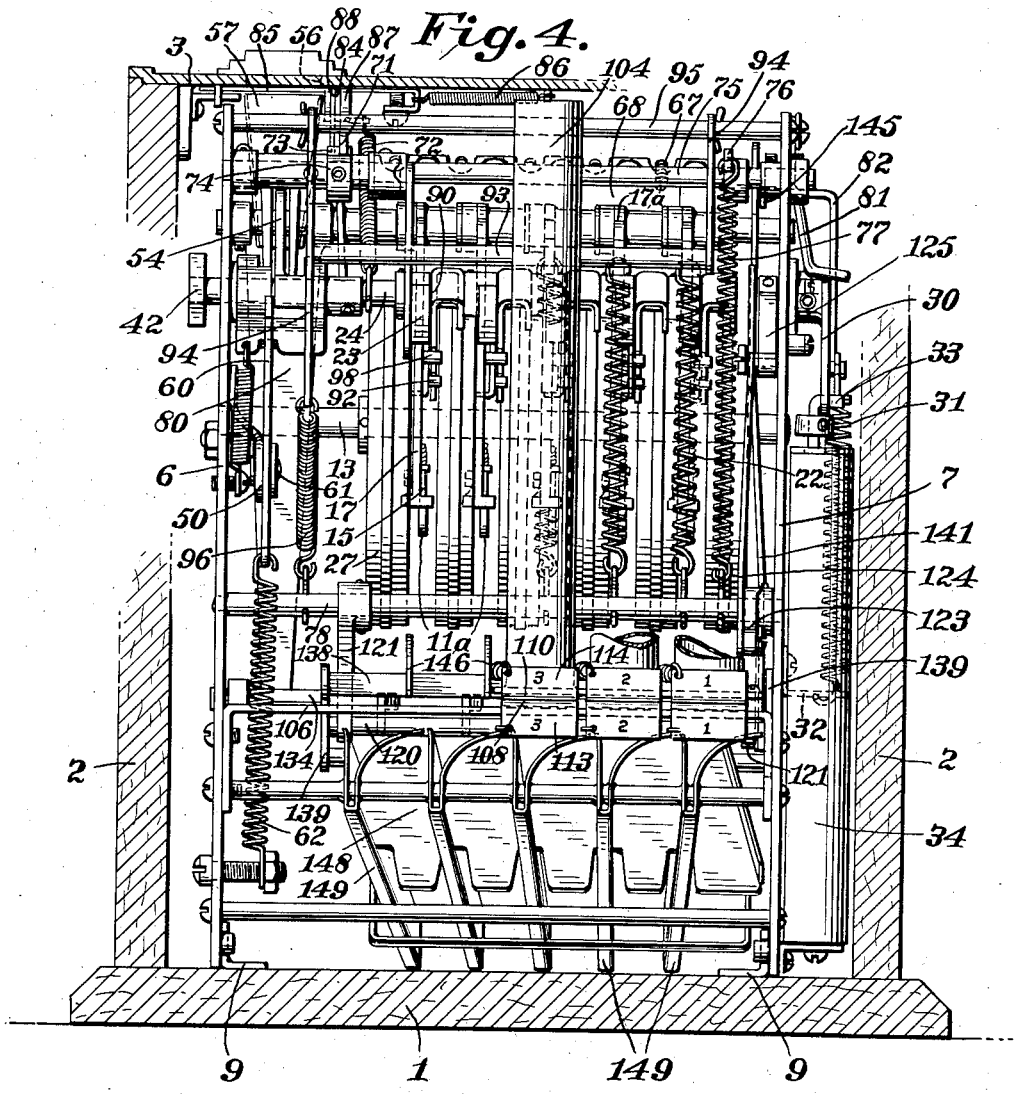
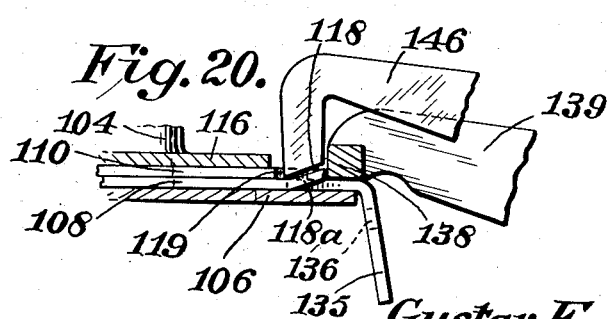

Aug. 6, 1935.  G. F. HOCHRIEM  2,010,487
GAME APPARATUS
Filed June 22, 1932  8 Sheets-Sheet 5
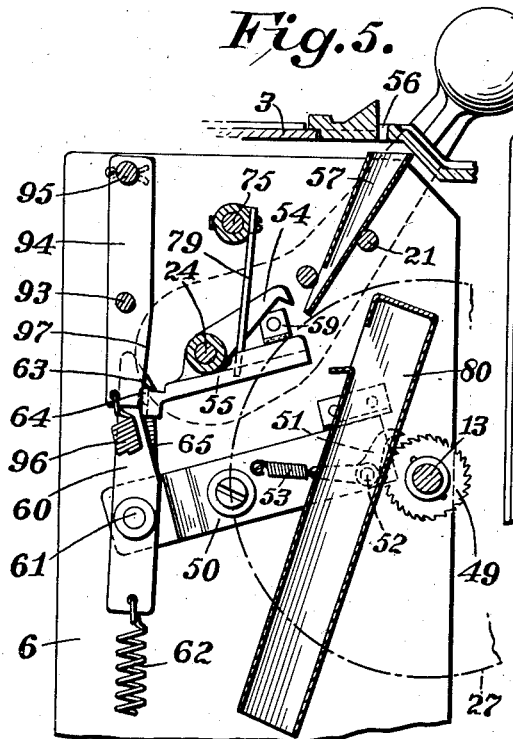
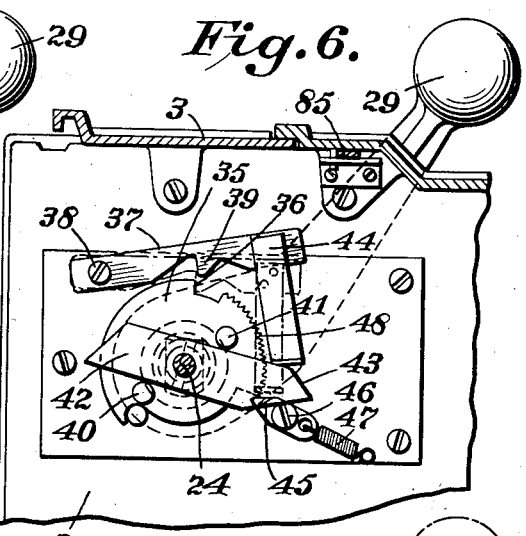
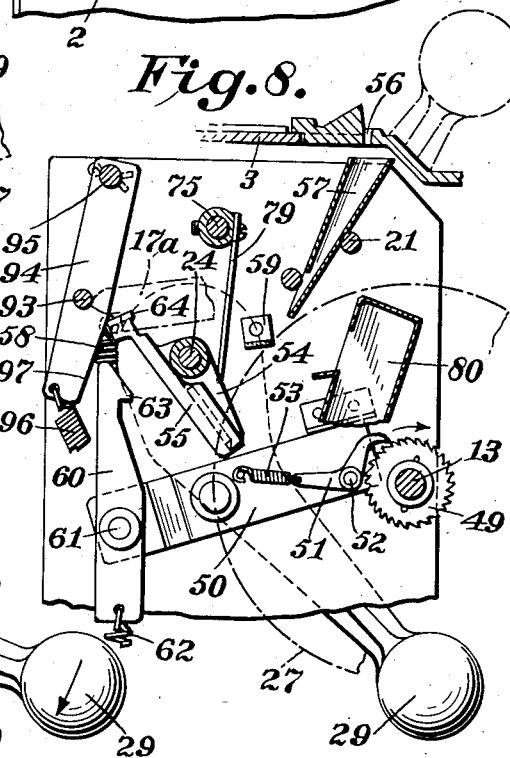
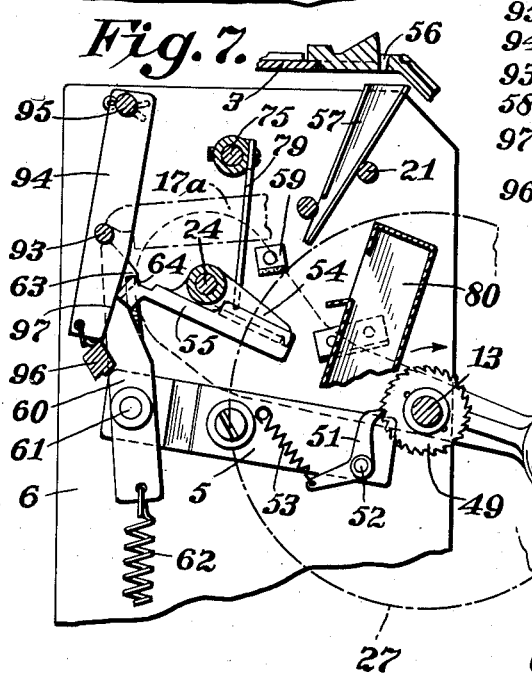
Inventor:
Gustav F. Hochriem,
By Sturtevant, Mason & Porter
Attorneys Gustav F. Hochriem, Aug. 6, 1935.   G. F. HOCHRIEM   2,010,487
GAME APPARATUS
Filed June 22, 1932    8 Sheets-Sheet 7
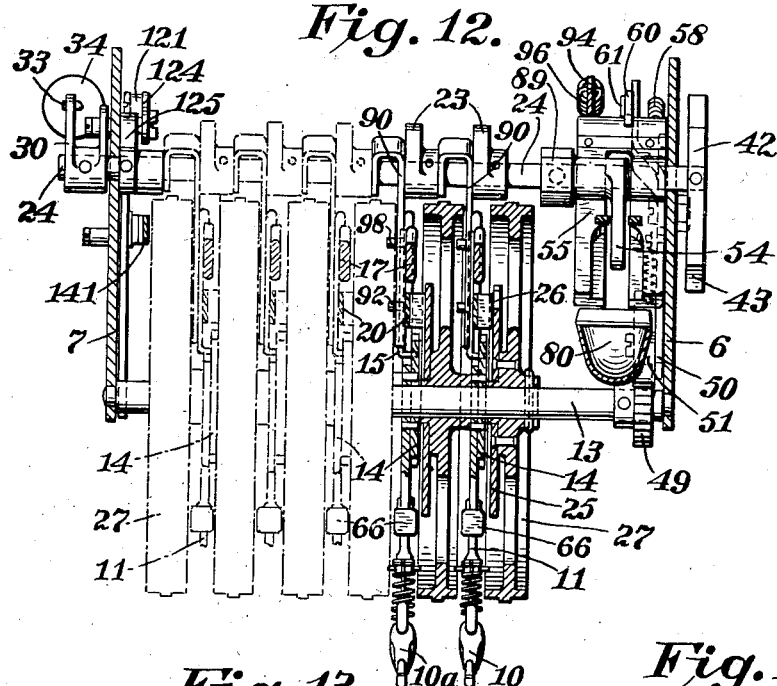
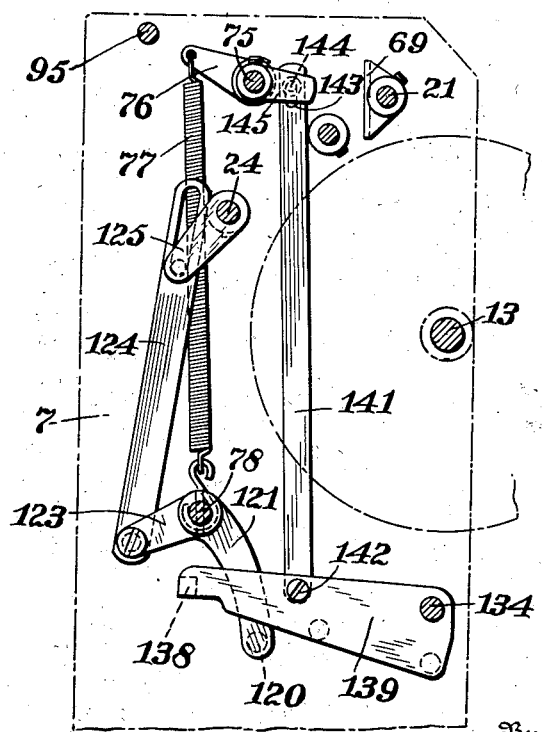
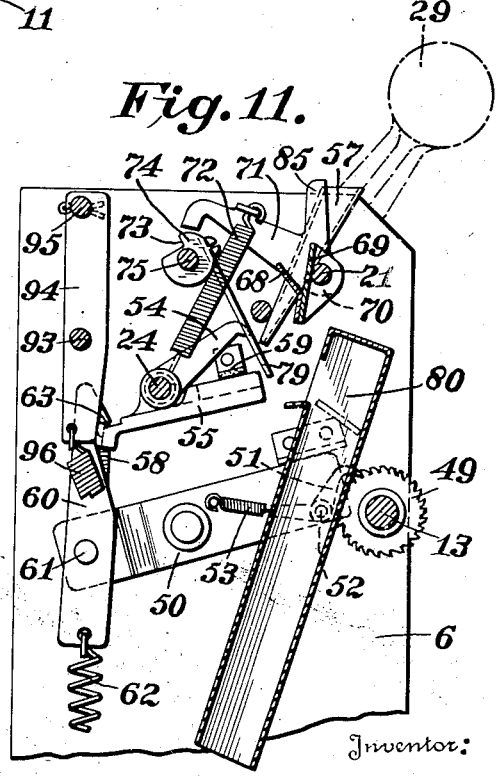
Inventor:
Gustav F. Hochriem,
By Sturtevant, Mason & Porter
Attorneys.

Aug. 6, 1935.    G. F. HOCHRIEM    2,010,487
GAME APPARATUS
Filed June 22, 1932    8 Sheets-Sheet 8

Inventor:
Gustav F. Hochriem,
By Sturtevant, Mason & Porter
Attorneys.

Patented Aug. 6, 1935

2,010,487

UNITED STATES PATENT OFFICE 2,010,487

GAME APPARATUS

Gustav F. Hochriem, Chicago, Ill.

Application June 22, 1932, Serial No. 618,763

16 Claims. (Cl. 194—86)

The invention relates to new and useful improvements in a game apparatus.

An object of the invention is to provide a game apparatus wherein a plurality of game pieces are moved separately step by step over a course by mechanism actuated by the player, and wherein the particular game piece to be moved is determined by the operating mechanism and is free from control of the player.

A further object of the invention is to provide a game apparatus of the above type wherein the members for determining the game piece to be stepped forward are moved by inertia to a set position.

A still further object of the invention is to provide a game apparatus of the above type with means whereby the game piece first to complete the course operates a winning signal and initiates the release of all of the game pieces for return to normal starting position on the next or setting movement of the operating lever.

A still further object of the invention is to provide a game apparatus of the above type wherein the operating mechanism is coin-connected to the actuating lever therefor.

A still further object of the invention is to provide a game apparatus of the above type, with a check vending device associated with each game piece, and wherein each vending device is jointly controlled by a coin deposited in a coin slot and by the winning game piece.

A still further object of the invention is to provide a second or independent vending device associated with each game piece which is controlled independently by the winning game piece and operated simultaneously with the first-named vending device.

These and other objects will in part be obvious and will in part be hereinafter more fully described.

In the drawings which show by way of illustration one embodiment of the invention—

Fig. 3 is a central vertical section on the line 3—3 of Fig. 1, with the game pieces in normal starting position;

Fig. 3a is a detail showing one of the control rods for closing the coin slot;

Fig. 4 is a rear elevation with certain parts omitted or broken away for clearness of illustration;

Fig. 5 is a fragmental vertical sectional view, complementary to Fig. 3, and showing the coin-connected mechanism in normal position;

Fig. 6 is a detail sectional view similar to Fig. 5, but showing the full stroke mechanism with the disconnecting feature for the supporting frame;

Fig. 7 is a detail sectional view similar to Fig. 5, but showing the parts shifted to a different position;

Fig. 8 is a similar view showing the hand-operated lever at full down-stroke with the parts operated accordingly;

Fig. 11 is a fragmental vertical sectional view similar to Fig. 5, but showing the coin ejected and certain of the parts released preparatory to return to normal position on the succeeding stroke of the hand lever;

Fig. 12 is a fragmental horizontal sectional plan view showing a plurality of game pieces with associated parts only in dot and dash lines;

Fig. 13 is a vertical sectional view inside the left-hand frame plate to show certain operating lever mechanism;

Fig. 19 is a sectional view showing a slightly modified form of control means for the vending slides, and Fig. 20 is a detail showing the vending slides and the latching control bar therefor.

Figure 1:
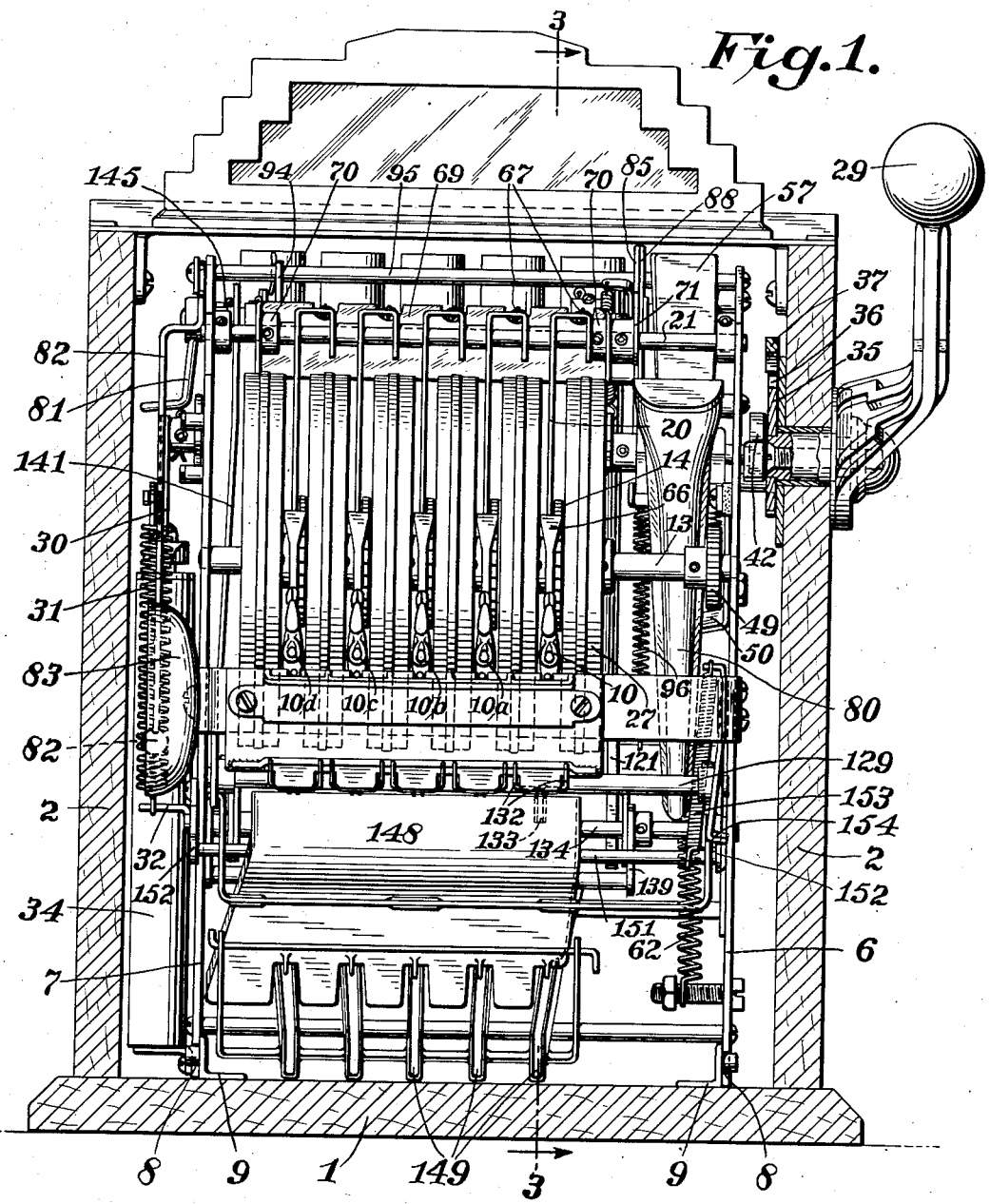
Figure 1 is a front elevation of a game apparatus with the enclosed casing in section substantially along the operating shaft.

The invention has to do with a game apparatus and includes an enclosed casing in which the game apparatus is mounted. The game apparatus is provided with a plurality of game pieces located within the casing and which may be viewed through a transparent panel. The game pieces are mounted for independent movement, step by step, over a given course. Associated with each game piece is a ratchet. A feed lever carries a feed pawl which is adapted to engage the ratchet on each stroke of the feed lever and to turn the ratchet on certain strokes of the feed lever only. There is a holding pawl for holding the game piece in a set position when it has been moved one step. There is a control disk for each game piece which is given a spinning movement by the player, and which through inertia, is moved to a set position free from control of the player. The control disks are all secured to the same shaft and rotate together. The disks are provided with recesses in the periphery thereof, which recesses are staggered relative to each other. These disks control the movement of the feed pawls. When there is a recess opposite a pin on the feed lever, it is given a stroke sufficient to turn the game piece through one step. If there is no recess, then the movement of the feed lever is restrained by the control disk, and no movement is imparted to the game piece. The feed levers are actuated by the player through an operating lever outside of the casing. A shaft connected to said operating lever is provided with a cam for retracting the feed levers and springs move the feed levers forward when they are released. On the down-stroke of the operating lever, the feed levers are retracted, and on the up-stroke of said lever, the feed levers move forward to selectively operate the game pieces and only one game piece is moved. There is a coin-controlled means through which the control disks are rotated or given their spinning movement. On the down-stroke of the operating lever, an actuating pawl is moved into contact with the ratchet on the shaft carrying the control disk, and is released to give to said shaft this spinning movement, so that the shaft comes to a set position when the inertia is spent, and this set position of the control disk is entirely free from control by the player. When the winning game piece has completed its course, it operates to release all of the holding pawls, eject the coin, and actuate the signal. On the next stroke of the operating lever the feed levers are retracted, releasing the game pieces which return to their normal position. At this time the feed levers are locked in an inoperative position, and it is only when another coin is inserted in the machine that the feed levers are released. There is associated with the game apparatus a check delivering mechanism, one for each game piece. This check delivering mechanism is controlled jointly by a coin placed in a slot and by the winning game piece. It is thought that the invention will be made more clear by a detail description of the illustrated embodiment thereof.

The game apparatus is all contained in an enclosed casing which may be of any desired shaping. As shown in the drawings, the casing includes a supporting base 1, side members 2, 2, a top portion 3, and a back portion 4 which is removable for the purpose of permitting the insertion or removal of the carrying frame on which the actuating parts of the game apparatus are mounted. The casing is provided with a transparent panel 5 through which the game pieces may be viewed.

Slidably mounted in this casing is a supporting frame for the game pieces and the parts which operate the same. As shown in Fig. 4, this supporting frame includes side plates 6 and 7 which are connected by cross rods so that they are rigidly attached and held in spaced relation to each other. When the frame slides into the casing, there is a recess in each side plate indicated at 8, which engages a pin carried by an L-shaped track bar 9. The track bar is also provided with a recess in its rear end, and the plate is provided with a pin which engages said recess. This provides a means for securing the supporting frame to the casing so that when in place it will be rigidly held therein. When the back plate 4 is placed, it holds the frame seated in these notches just referred to.

The game apparatus includes a plurality of game pieces. As shown in the drawings, the game pieces are shaped to represent racing horses. There are five game pieces which are indicated at 10, 10ª, 10ᵇ, 10ᶜ and 10ᵈ, respectively. There could, of course, be more game pieces or a less number of game pieces. The game pieces are similarly mounted and each is provided with an actuating means therefor, and also a control means. Inasmuch as these units are all similar in construction, so far as the operation of the game pieces are concerned, a description of one will answer for the others. The game piece 10 is mounted on an arm 11. There is a flexible supporting member 12 attached to the end of the arm and carrying the game piece. The arm 11 is mounted on a shaft 13 for free movement on the shaft. Attached to the arm 11 is a ratchet wheel 14. Cooperating with this ratchet wheel is an actuating pawl 15 which is pivoted at 16 to a bell crank lever 17. A spring 18 holds the pawl against a stop pin 19. The pawl is, therefore, capable of yielding in a downward direction. When the rock lever is moved in a counter-clockwise direction, as viewed in Fig. 3, the pawl 15 engages the ratchet and will turn the arm 11 and the game piece carried thereby one step forward in a counter-clockwise direction. A holding pawl 20 freely pivoted on the shaft 21 is adapted to swing so as to engage the ratchet wheel 14 and hold the game piece in the set position to which it has been moved by the actuating pawl 15. The movement of the operating lever 17 moves the game piece through only a portion of the course or race-track over which it travels. As constructed in the present machine, four operating impulses of the pawl 15 are necessary in order to carry a game piece completely over its course.

The actuating bell crank lever 17 is moved in a counter-clockwise direction by a spring 22 which is attached at one end to the lever and at its other end to one of the cross bars forming a part of the supporting frame. This bell crank lever is moved in a clockwise direction by a cam 23 on a shaft 24. When the shaft is oscillated, it moves the cam into engagement with the arm 17ª of the bell crank lever, and this raises the bell crank lever. When the shaft is turned in the opposite direction, it releases the bell crank lever, and the spring operating thereon turns it in a counter-clockwise direction, moving the actuating pawl 15 forward, so that if it moves through its full stroke, it will engage the ratchet and turn the same through one step movement. This shaft 24 is actuated by the player through the mechanism which will be hereinafter more fully described. The mechanism for controlling the movements of the game pieces may be free from coin control, but is preferably controlled by a coin as will now be described.

Associated with each game piece is a control disk which is initiated in its operation by the player, but this control disk is inertia-driven to a set position, so that the setting of the disk is entirely free from the control of the player.

The control disk for the game piece 10 is indicated at 25 in the drawings. Each control disk is provided with three cutaway portions or recesses 26. The control disk is fixed to an inertia wheel 27, and this inertia wheel 27 and the control disk are in turn fixed to the shaft 13. The shaft 13 is given a spinning, rotating movement, initiated by the player, and these inertia wheels will continue to rotate the shaft until the inertia is spent, and then the shaft comes to a stationary position. The control disks and inertia wheels associated with all of the game pieces are fixed to the one shaft and rotated together. Mounted on the bell crank lever 17 carrying the actuating pawl is a pin 28. When the spring operates this bell crank lever, turning the same in a clockwise direction, its movement is limited by this pin engaging the peripheral surface of the disk or by the pin moving into the recess and engaging the bottom wall thereof. If the pin should strike the peripheral face of the disk, the stroke of the actuating pawl is not sufficient to engage the ratchet and turn the game piece. On the other hand, when the pin moves into the recess, then the stroke of the actuating pawl is sufficient to move with the ratchet, and turn a game piece through one step movement. The holding pawl 20 contacting with the ratchet will retain the game piece in this set position when the actuating pawl is retracted. The shaft 24 carrying the cam 23 is oscillated by means of a hand lever 29 located outside of the casing. When this hand lever is depressed, then the shaft 24 is turned in a clockwise direction. This will turn the bell crank lever 17 in a clockwise direction and retract the actuating pawl. On the up-stroke of the hand lever 29, when it is released by the player, it turns the shaft 24 in a counter-clockwise direction permitting the spring 22 to move the bell crank lever 17 and thus move the actuating pawl 15 for its stroke, which is determined by the control disk 25.

Figure 2:
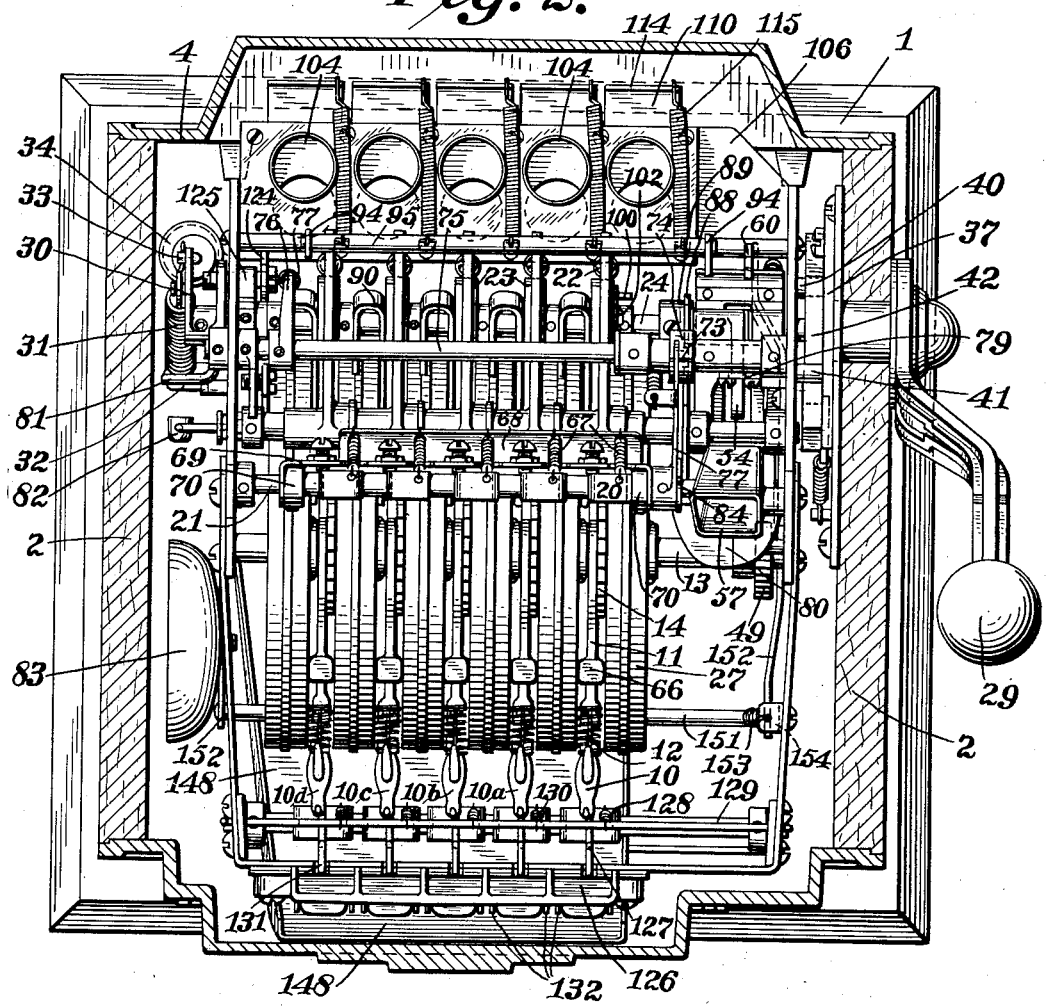
Fig. 2 is a top plan view with the casing in section.
Figure 17:
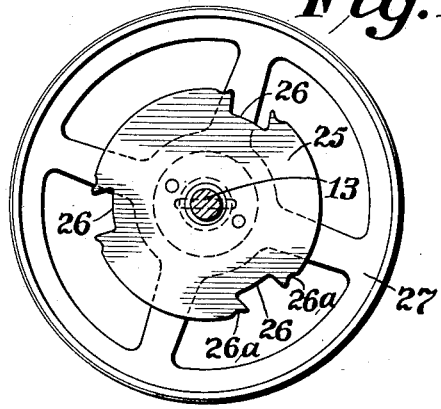
Fig. 17 is a detail showing in side view one of the control disks.

It will be obvious that it is not necessary to wait for the inertia wheel to come to a standstill before the player releases the operating lever 29. When the lever is released and the actuating pawl moved forward, it will either engage the periphery or a recess, if the wheel is slowly moving. It is preferred, however, that the inertia wheel should come to a standstill before the hand lever is released, and a dashpot mechanism is attached to the shaft 24 to retard its return movement. On the end of the shaft 24 is fixed an arm 30 (see Fig. 2). A spring 31 is attached to this arm and to a lug 32 on one end plate of the supporting frame. This spring normally tends to turn the shaft 24 in a counterclockwise direction, as viewed in Fig. 3, and this is in the direction for raising the hand lever. The hand lever is depressed by the player, storing power in this spring 31 which returns the hand lever when it is released. Also attached to the arm 30 is a rod 33 of a dashpot 34 which is of the usual construction. This is arranged so as to retard the upward movement of the operating lever through the action of the spring thereon when the player releases the hand lever.

The hand-operated lever 29 is secured to a short shaft mounted in the casing independent of the supporting frame for the game apparatus. This shaft is in alinement with the shaft 24 when the supporting frame is inserted in the casing. The shaft to which the hand-operated lever is attached carries a control disk 35. Said disk is provided with a notch which forms a holding tooth 36. A locking pawl 37 is pivoted at 38 to a plate which in turn is attached to the casing, and this pawl is provided with a holding lug 39 adapted to engage the tooth 36 when the operating lever 29 is at the upper end of its stroke. On this disk 35 are two radially spaced operating pins 40 and 41. Attached to the shaft 24 is a crosshead 42. When the actuated parts of the game apparatus are in their initial set position, this crosshead 42 is substantially horizontal, so that the slipping of the supporting frame into the casing moves the crosshead between the pins 40 and 41. The crosshead has a downwardly inclined projection 43. The pawl 37 carries a depending arm 44, and when this supporting frame for the game apparatus is moved into the casing, this depending projection 43 engages the arm 44 and will lift the pawl 37 so as to release the operating lever. In Fig. 6 of the drawings, the pawl is shown in full lines as raised and having released the operating handle, while in dotted lines, it is shown as having dropped to a position for locking the handle in its raised position. When the supporting frame is removed from the casing, the pawl is released and will lock the operating lever in its raised position. This insures that the operating lever will be properly positioned so that the crosshead may be inserted between the operating pins 40 and 41.

Associated with this control disk 25 is a dog 45 which is pivoted at 46. A spring 47 attached to the dog and to a pin on the plate attached to the casing, normally holds the dog so that it will contact with the ratchet face 48 on the disk 35. The disk is cut away at the ends of the ratchet face, and the dog is sufficiently long so as to extend into the cut away portions when it is in a radial position relative to the shaft 24. When the disk 35 is turned in a clockwise direction, as viewed in Fig. 6, the dog will be engaged by the ratchet face 48 and will take a position which will prevent the return of the operating lever until it has been forced all the way down to its extreme lowest position. When it reaches the lowest position, the dog passes off from the ratchet face and will be reversed and serve as a holding dog to prevent partial return of the operating lever. This insures that when the hand lever is moved downward or upward, it must be moved through the complete stroke of the operating lever. A stop 35ª engaging shoulders on the control disk 35 limit the up and down movements of the operating lever.

The means for spinning the inertia wheels will now be described. Mounted on the shaft 13 is a ratchet wheel 49 which is fixed to the shaft. Pivoted to one of the end plates of a supporting frame is a lever 50. This lever carries a pawl 51 which is pivoted at 52 to the lever. A spring 53 normally urges the pawl toward the ratchet wheel. The spring and the arm of the pawl, however, are in alinement when the lever is at the upper end of its stroke, and the pawl is held out of contact with the ratchet wheel. When the lever is moved in a clockwise direction, the pawl will engage the ratchet and slip down over the ratchet to the position shown in Fig. 7. Upon the upward movement of the lever 50, the pawl will engage the ratchet and will rotate the shaft 13 in the direction of the arrow (Fig. 8), and will release the ratchet so as to impart to the shaft 13 and the inertia wheels carried thereby a spinning motion. In other words, the pawl initiates the rotation of the shaft 13 and then is disconnected therefrom so that the shaft may continue to rotate until the inertia is spent, and then it will stop, if in the meanwhile, the actuating lever is not released so as to contact therewith and stop the movement of the inertia wheels. In the present machine, the lever 50 is coin-operated. Attached to the shaft 24 is an arm 54. Mounted for free movement on the shaft 24 is a coin rest or supporting member 55. Said coin rest or supporting member 55 is provided with two spaced arms, and the arm 54 is attached to the shaft so as to swing in the space between these arms, provided there is no coin on the coin rest. The coin is inserted into the machine through a slot 56 in the casing, and drops into a chute 57 which directs the coin on to the coin rest or support 55. A spring 58 is attached to this coin rest 55 and normally rotates said support in a counter-clockwise direction, and its movement is limited by a stop lug 59 on the end plate of the supporting frame. When the coin is placed on the rest and the arm 54 is turned in a clockwise direction, it will clamp the coin against this coin support or rest 55 and the rotation of the shaft 24 will thus impart a rotation to the coin support 55 in a clockwise direction. Attached to the lever 50 is a pawl 60. Said pawl is pivoted at 61 to the lever. A spring 62 is attached to the lower end of the pawl and to the end plate and normally pulls down on the pawl, swinging the lever 50 to the position shown in Figures 5 and 8. The pawl 60 has a forwardly projecting finger 63 which overlies a plate on the coin rest 55 engaging an upstanding lip 64 thereon. When the coin rest is rotated in a clockwise direction, it will raise this pawl 60, swinging the lever to the position shown in Fig. 7. A continued movement of the coin rest will cause the lower edge portion thereof to engage the cam face 65 of the pawl and thus disengage the pawl from the coin rest. This permits the spring 62 to quickly and forcibly return the lever 50 from the position shown in Fig. 7 to the position shown in Figures 5 and 8. The upward movement of the pawl 51 brings about the spinning of the shaft 13.

Figure 18:
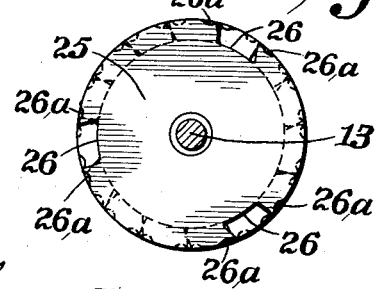
Fig. 18 is a detail showing the relative arrangement of all of the control disks.

The control disks for the different game pieces are similar in construction, but they are differently set on the shaft 13. In Fig. 18, there is shown an endwise view of the shaft 13 and the control disk thereon. The control disk for the game piece 10 is the front disk, and is shown as provided with recesses 26, 26, 26. There are three recesses. The recesses of the other disks are shown in dotted lines, and it will be noted that the recesses of no two disks are in alinement longitudinally of the shaft. At the same time, the disks are so dimensioned and spaced that regardless of the position in which the shaft stops, one of the recesses will be opposite the pin on one of the feed levers so that one of the feed levers will be operated to move the game piece associated therewith through one step movement. When the game piece has completed its movement along the race course, it releases the holding pawl. The arm 11 has a projecting member 66 which contacts with the holding pawl 20 and releases said pawl from engagement with the ratchet 14 associated with the winning game piece. The swinging of the pawl 20 to a releasing position also turns the shaft 21 for limited free movement. There is a spring 67 attached to the upper end of the holding pawl and to a plate 68 which is fixed to the shaft. The plate extends lengthwise of the shaft and is attached to a second plate 69 which in turn is fixed to collars 70, 70 secured to the shaft 21 by set screws. Attached to the plate 69 is a stop screw 69' which is adjustable and this stop screw limits the movement of the holding pawl on the shaft through the action of the spring 67. The holding pawl is yieldingly urged toward the ratchet and when in position to engage therewith, it has a yielding movement to pass from one ratchet tooth to the other. When, however, the arm 66 engages the holding pawl, it will move the holding pawl so as to completely release the ratchet, and will cause the pawl to engage the plate 69 and swing the shaft 21 and move all of the holding pawls so that all of the ratchets will be released and the game pieces will all return to their initial position. The arm 11 is provided with a member 11ª which contacts with the lower end of the rock lever 17 and limits the movement of the game pieces when released. All the game pieces take this initial position when they are released, and they will be moved forward step by step, independently, by the feeding devices which in turn are controlled by the inertia-set control disks, and the player, therefore, cannot in any way determine which game piece is to be moved forward. It depends purely upon which disk has a recess set opposite the actuating devices for the game pieces that determines which game piece is to be moved forward, and as stated, the setting of the disks is determined wholly by the spinning movement of the inertia wheels. When the shaft 21 is oscillated through the arm of the winning game piece contacting therewith, it also rings a bell, closes the coin slot 56 and ejects the coin from the coin support. Mounted on the shaft 21 is an arm 71 which is pressed by a spring 72 in a direction so that the hook end thereof engages a lug 73 carried by a collar 74 attached to the shaft 75. The turning of the shaft 21 in a clockwise direction releases this holding arm so that the shaft 75 may rotate through a limited movement. The shaft 75 carries an arm 76 which is attached to a spring 77 (see Fig. 13). This spring is connected to a cross shaft 78. The spring tends to rotate the shaft 75 in a counter-clockwise direction, and this movement of the shaft is restrained by the holding arms 71. When the arm is moved upward and releases the shaft, then it has this limited movement referred to. Attached to the shaft 75 is a knockout arm 79 which moves across the coin support and casts the coin therefrom into a chute 80 which discharges the coin into a suitable receptacle (not shown) at the base of the machine. The shaft also carries at its extreme left-hand end, as viewed in Fig. 1, an arm 81 which operates a hammer 82, forcing the same against a bell 83. Fixed to the shaft 21 is an arm 84 which controls a plate closing the coin slot. The plate is indicated at 85 in Fig. 4 of the drawings. This plate is normally moved away from the slot by a spring 86. Said plate has a depending lip 87 with which the arm 84 contacts, and this oscillates the plate, moving the same across the coin slot for closing the same. The coin slot remains closed, therefore, until the parts have been re-set or moved to initial position. There is also an arm 88 mounted on one of the cross rods which operates to close this coin slot. This arm 88 cooperates with a cam 89 on the shaft 24. When the shaft 24 is turned through the depressing of the operating lever, it closes the coin slot, and only releases the coin slot when the operating lever is at the upper end of its stroke.

In order that the game pieces may be completely released from both the holding pawl and the actuating pawl therefor and returned to their initial position, the following mechanism has been provided. The winning game piece engaging the holding pawl 20 of one game piece through movement of the shaft 21 releases all of the holding pawls 20. A dog 90 is loosely mounted on the shaft 24 and is provided with a hook end 91. This hook end drops over a pin 92 on the holding pawl. There is, of course, a locking dog for each holding pawl, and this will hold the pawls 20 out of contact with the ratchet. The bell crank lever 17 has a projecting end portion on an arm 17ª which overlies a control bar 93. This control bar 93 is supported by arms 94 pivoted on a cross bar 95. One of the arms extends downward into the path of oscillation of the coin rest 55. A spring 96 moves the rod 93 toward the arm 17ª of the bell crank feed lever. When the arm 17ª is in raised position, the bar 93, if free, will move underneath the projecting end of the arm and thus restrain the bell crank lever from movement through the action of the spring 22, even though the shaft 24 is turned so as to remove the cam from beneath said arm 17ª. In this way, the actuating pawl 15 is held retracted from engagement with the ratchet, and this permits the free return of the game pieces, although the player may release the operating lever and turn the shaft 24 prior to the full return of the game pieces. When there is no coin on the coin supporting plate, the shaft 24 may be turned without moving the coin supporting plate. This turning of the shaft 24 causes the cam carried thereby to lift the arm 17ª so that the bar 93 will pass beneath the outer end thereof. When, however, a coin is placed on the coin support, and the coin support is turned, then it will contact with the cam face 97 of the arm 94 and force the bar 93 outward so as to release the bell crank feed levers. As long as there is a coin on the coin support, this bar 93 will be moved out of active position and will permit the free oscillations of the bell crank feed levers. When the feed lever is released so that it moves forward, a pin 98 on the feed lever engages a shoulder 99 and lifts the dog 90 so as to release the holding pawls 20.

The shaft 75 when released from the holding pawl 71 is rotated in a counter-clockwise direction. When the shaft 24 is rotated in a clockwise direction, a pin 100 engages a shoulder 101 in a link 102 pivoted at 103 to an arm carried by the shaft 75. This will oscillate the shaft 75 in a clockwise direction to a position where the holding pawl 71 will drop into engagement with the lug 73 and thus hold the shaft 75 in this latched position. When the pawl 71 drops to its latched position, the coin slot is open, and the coin may be inserted. It is thought that the operation of the game apparatus as described will be obvious. A coin is placed in the slot which enables the player, upon the depressing of the operating lever 29 to spin the shaft 13 and bring the inertia wheels to a set position. This is accomplished on the downward movement of the operating lever. On the upward movement of the operating lever, the cam 23 releases the feed levers which are spring-pressed so as to move the pawls 15 forward. If the control disk stops with the notch or recess opposite the pin on the feed lever, it will move into the notch, and the feed pawl carried thereby will become active to move the game piece associated therewith one step along its course. The holding dog will retain the game piece in this set position. Thus it is that the game pieces are moved step by step along their courses, and the one which is to be moved is determined entirely by the stopping or positioning of the inertia wheels, and this is entirely out of control of the player. When one of the game pieces has been moved over the entire course, then the bell is rung, the coin is cast out, and all of the holding pawls are released and locked in released position. Any game piece, however, which has been moved away from initial position, will, at this time, be held by the actuating pawl which engages the ratchet, regardless of whether the pin on the operating feed lever moves into contact with the periphery of the control disk or into the recess. While it contacts with the ratchet when the pin is in contact with the periphery of the control disk, there is really no advance movement given to the game piece. All of the game pieces are, at this time, held by the feed pawls, and as soon as the operating lever is depressed on the idle stroke, and without any coin, it will release the game pieces so that they return to their initial position. At this time, the feed pawls will all be held out of engagement with the ratchet by the control bar, and the holding pawls will also be held out of engagement with the ratchet. The manipulation of the operating lever without any coin being inserted in the machine will now be a mere idle movement. The control disk is provided with a notch in the periphery thereof adjacent each side of the recess 26 as indicated at 26ª. The purpose of this notch in the periphery is to insure that the pin on the feed lever will either enter the notch without wedging, or will be restrained from movement into the notch or recess in the control disk.

Figure 16:
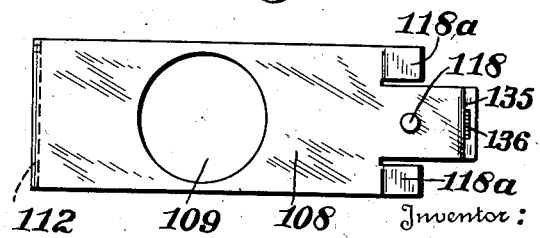
Fig. 16 is a similar view of the lower coin slide.

The game apparatus which has been described above is complete, and may be used with or without the coin control as has already been stated. It may also be used with other associated mechanisms wherein the winning game piece performs a function such as the vending of a merchandise check. In the present machine, such a mechanism has been shown. At the rear of the machine are five magazines, all similar in construction, and which are numbered 104. These magazines are carried by the supporting frame of the game apparatus. A filling slot 105 at the top of the magazine is closed by an overlying portion 4ª of the rear wall 4 of the casing. It is necessary to remove this wall in order to fill the magazines, as illustrated in the present drawings. The magazines are carried by a cross plate 106 having an opening therethrough indicated at 107 which is out of line with the magazine and slightly forward thereof. As shown in the drawings, there are two slides for vending the checks from the magazines. The lower slide 108 is shown in Fig. 16 of the drawings. It is provided with an opening 109 of the same dimensions as the magazine, and the merchandise check in the magazine will drop into this opening when the slide is properly positioned beneath the magazine. There is an upper slide 110 provided with a similar opening 111. When the two openings are in register, as shown in Fig. 3, two merchandise checks will pass from the magazine into these openings, one in the opening of each slide. The lowermost slide has a downwardly turned lip 112. Springs 113 connected to said lip and to a stud on the cross plate 106 normally forces the slide to the right, so as to bring the opening 109 therein into register with the opening 107 in the cross plate. The upper slide 110 has an upstanding lip 114 and springs 115 connected thereto and to a bracket on an upper cross plate 116 normally forces the upper slide forward to bring its opening 111 into register with the opening 107. The slides move between the upper and lower cross plates and are urged forward into register with the opening 107 by these springs. The lower slide carries a pin 118 which lies in front of a projecting tongue 119 on the upper slide 110. The slides are moved to the position shown in Fig. 3 by means of a bar 120 which extends across the machine and operates on all of the slides. This bar is carried by rock arms 121 mounted on a shaft 78. The shaft 78 carries an arm 123 which is connected by a link 124 to an arm 125 on the shaft 24 (see Fig. 13). Each time the shaft 24 is oscillated by the depressing of the operating lever, this bar 120 is moved rearward and contacts with the slides, if they have been released, and returns them to the position shown in Fig. 3.

Associated with the check dispensing means is a coin controlling trip for each magazine. At the front of the machine, there is a coin slot 126 associated with each game piece. This slot is controlled by a wire 127 carried by a rocking frame 128 mounted on a cross rod 129. A spring 130 normally tends to force the end 131 of the rod across the coin chute beneath the slot 126. The arm 11 supporting the game piece contacts with the wire 127 and retracts the wire from across the coin slot when the game piece is in its full retracted or initial position. Therefore, coins can be placed in the coin slot when all of the game pieces are retracted. When, however, a game piece has been moved one step forward along its course, it will release the wire which will close the coin slot associated with said game piece, so that no coin can be inserted in the slot. Any game piece, however, which has not been moved away from its initial position, retracts the wire and holds the coin slot open. When a coin is placed in the coin slot, it will drop on to the fingers 132 carried by a lever 133 which is pivoted on the cross bar 134. It is understood that there is a lever associated with each coin slot. This lever extends as at 133ª to a point in front of the slide 108. Said slide has a depending member 135 with an opening 136 therein. The inner end portion 133ª of the lever 133 is provided with cam faces 137 leading to a projecting nose. When there is no coin in a slot, then this projecting nose is directly opposite the opening 136 in the depending member of the lower slide. The releasing of the slide will cause the same to engage the lever end 133ª, and prevent its being moved by the player. This prevents the player manipulating the lever to release the lower slide and insures that it will only be released by the placing of a coin in the coin slot. When the slides are in retracted position, that is, in the position shown in Fig. 3, they are held in this position by means of a locking bar 138. This locking bar extends across the machine and operates in connection with each magazine and the controlling slides therefor. This locking bar when lowered, is engaged by the upturned fingers 118ª carried by the slide 108. When the locking bar is in its lowered position, it retracts the movement of the slide 108, and the pin 118 contacting with the tongue 119 on the slide 110 will also restrain the movement of the upper slide. This bar, however, locks both slides against movement by the springs connected thereto. The bar 138 is connected to arms 139 which are pivotally mounted on the cross bar or rod 134. A link 141 is pivoted at 142 to one of the arms 139. This link has a slot 143 at its upper end which engages a pin 144 on an arm 145 attached to the shaft 75 (see Fig. 13). When the winning game piece releases this shaft 75 from contact with the holding arm 20, the rotation of the shaft through the action of the spring 77 not only casts out the coin controlling the operating lever and rings the bell, but it also lifts this control bar and releases the lower slide. It releases the lower slides in connection with all of the magazines. When a coin is placed in one of the slots 126, the lever 133 is moved downward by the coin to a sufficient extent so as to raise the inner end thereof and carry the cam face 137 above the lowermost slide. This releases the slide only of the magazine associated with the coin slot in which the coin is placed. All of the other slides will be held from movement by this lever 133 if there is no coin placed in the coin receiving slot. In other words, if one coin is placed in one coin slot, and the others are vacant, when the control bar 138 is raised, the lower slide of the magazine will be the only lower slide to be released, as the remaining lower slides are held by its lever 133. Associated with each magazine is a latch lever 146. This latch lever 146 operates to control the upper slide only. The end of the latch lever normally lies in the path of movement of the upper slide when it is fully retracted. The arm 11ª of the winning game piece will contact with the yielding arm 147 which rocks the lever 146, and lifts the same, thus releasing the upper slide, so that when the control bar moves upward to release all of the slides, it will likewise release this upper slide. The upper slide, however, even of the winning game piece will be held from movement by the lower slide, if said lower slide is not released by the placing of a coin in the coin slot associated therewith. If the coin is placed in the slot of the winning game piece, then two merchandise checks will be released, and in all operations of the mechanism, at least one merchandise check is released whenever a coin is placed in one of the slots. If coins are placed in all of the slots, then there will be merchandise checks released from all of the magazines when any one of the game pieces completes the course and lifts the control bar, and there will be two merchandise checks released from the magazine associated with the winning game piece.

The coin slots associated with the merchandise checks are preferably designed to receive a five cent piece, while the coin slot and the mechanism associated therewith for controlling the operating lever is preferably designed and shaped to receive one penny. If a penny be placed in one of the front coin slots, it will pass between the fingers on the control lever and will not operate the same. After the merchandise checks have been released, the slides are restored by means of the control bar 120, as has already been described. When the lowermost slide moves forward, it will engage the cam face 137 and lower the front end of the lever 130 so as to release the coin. The coin drops on to a chute 148 and is discharged into a suitable receptacle in the base of the machine. The merchandise checks drop into chutes 149. There is one chute for each magazine, and the chutes are so shaped as to turn a merchandise check into a vertical position so that it will roll down the inclined chute and be discharged into the receiver 150 at the front of the machine where it is readily accessible to the player.

Figure 9:
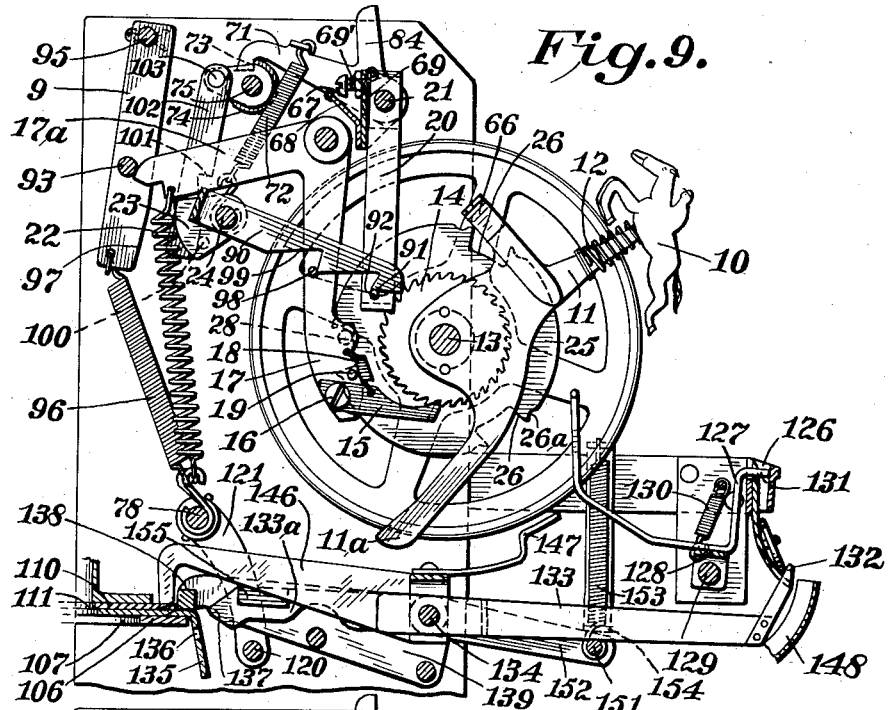
Fig. 9 is a fragmental vertical sectional view similar to Fig. 3, and showing the mechanism as operated to advance the game piece to an intermediate position in the raceway.
Figure 10:
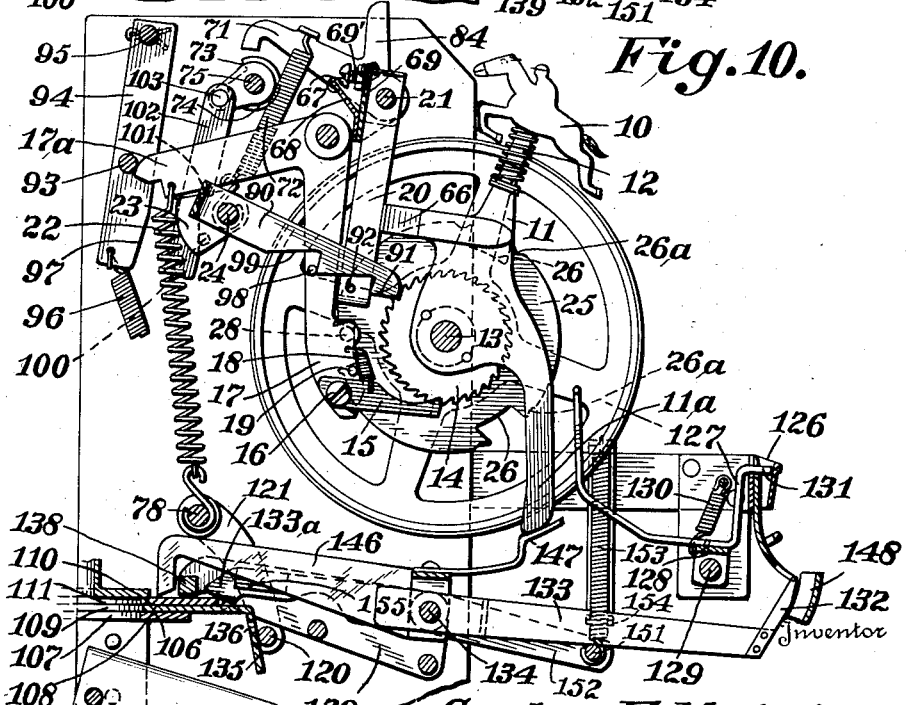
Fig. 10 is a view similar to Fig. 9, but showing the game piece advanced to the final or winning position, and all parts actuated accordingly.
Figure 14:
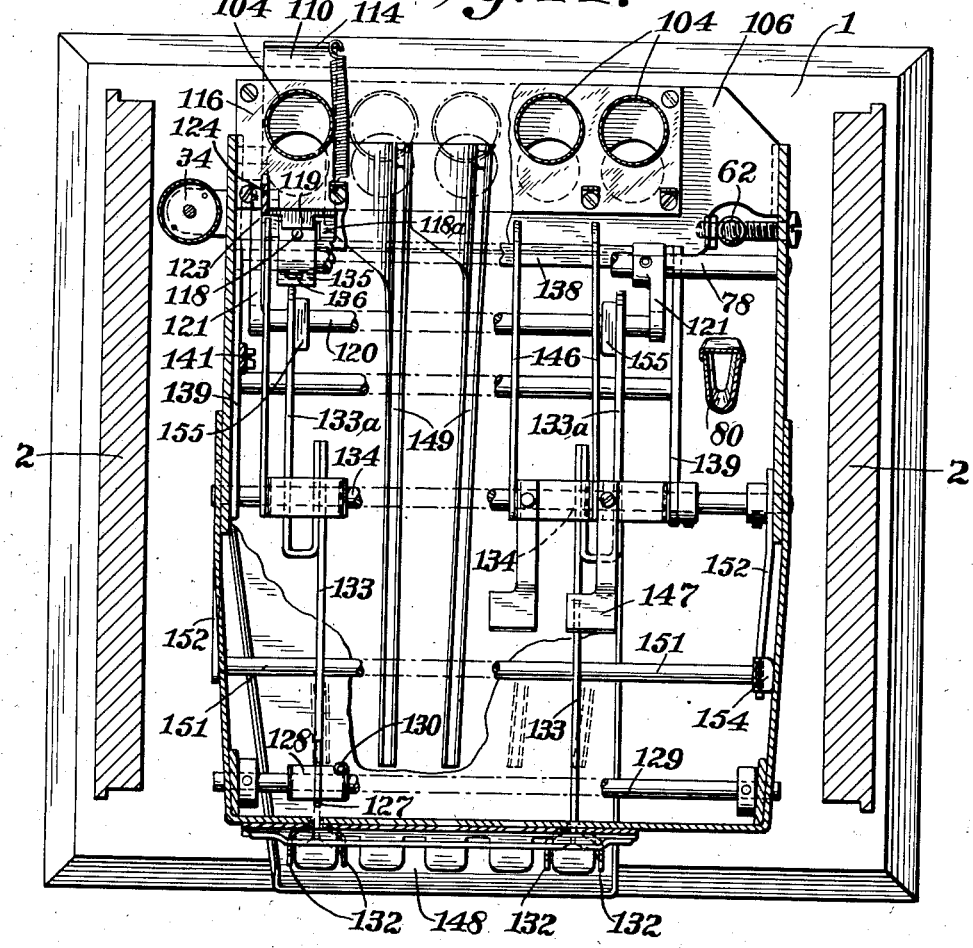
Fig. 14 is a horizontal sectional plan view substantially on the line 14—14 of Fig. 3, with parts omitted and other parts broken away for clearness of illustration.
Figure 15:
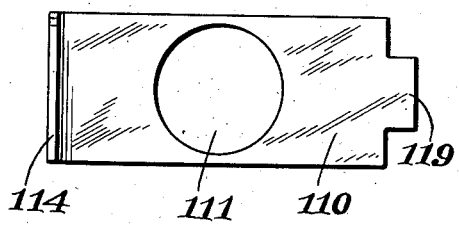
Fig. 15 is an enlarged plan view of one of the upper coin slides.

Extending beneath the levers 133 is a universal bar 151 carried by arms 152 which are pivotally mounted on the rod 134. A spring 153 normally lifts the universal bar until it contacts with a stop 154 (see Fig. 9). Also carried by the lever 133 is a counterweight 155 attached to the end 133ª of the lever. This counterweight holds the lever raised to the position shown in Fig. 3 when there is no coin in the slot. The lever is at this time raised from its contact with the universal bar 151. When a coin is placed in the slot, it slides into engagement with the fingers 132 and will move the lever 133 associated with the coin slot downward until it rests on the universal bar 151. This will raise the cam end of the lever 133 so that the lowermost slide will pass beneath the same. When the slide moves into contact with the lower cam face on the lever end 133ª, it will force the universal bar downward to the position shown in Fig. 10, and this will withdraw the fingers 132 and allow the coin to be discharged into the chute 148. When the slide is returned through the movement of the bar 120, then the lever 133 is released and returned to the position shown in Fig. 3, with the cam end 137 thereof opposite the opening 136.

In Fig. 19 of the drawings, there is shown a latching means for rendering the upper slides inoperative under any condition. This latching means includes a cross shaft 156 carrying arms 157 and associated with each magazine. There is a handle 158 attached to the shaft so that the fingers may be swung to the position shown at the left in Fig. 19, or to the position shown at the right in said figure. When these fingers are in the position shown at the left, they will be engaged by the lip 114 whenever they are released, and this will restrain the slide from movement, even though the coin lever 133 has been depressed by the coin, the bar 138 released through the operation of the winning game piece, and the latch 146 raised through the operation of the winning game piece. In other words, these arms 157 render the uppermost slides inoperative so that the game apparatus is then actually provided with a vending device for a single check from each magazine.

As has already been noted, the game apparatus is coin controlled by devices connected by an inserted coin which controls the movements of the feed levers. It will be obvious that other ways of controlling the game apparatus and the vending devices by the insertion of a coin may be provided, and that a mechanical means may be utilized in place of the coin control, and the game apparatus operated without requiring the deposit of any coin. It will also be obvious that changes in the details of the construction and the arrangement of the parts may be made without departing from the spirit of the invention as set forth in the appended claims.

Having thus described the invention, what I claim as new and desire to secure by Letters-Patent, is—

1. A game apparatus comprising a plurality of game pieces mounted for separate movement step by step over a course and mechanism actuated by the player for moving the game pieces one at a time, said mechanism including control members moved by inertia to a set position for determining the game piece to be moved by an actuation of the operating mechanism by a player.

2. A game apparatus comprising a plurality of game pieces mounted for separate movement of game pieces mounted for separate movement step by step over a course and mechanism actuated by the player for moving the game pieces one at a time, said mechanism including connected control disks moved by inertia to a set position and having peripheral recesses out of alignment for determining the game piece which is to be moved by an actuation of the operating mechanism by a player.

3. A game apparatus comprising a plurality of game pieces mounted for separate movement step by step over a course, mechanism actuated by the player for moving the game pieces one at a time, said mechanism including control members moved by inertia to a set position for determining the game piece to be moved by an actuation of the operating mechanism by a player and coin controlled devices for initiating the movement of the control members and the actuating mechanism for the game pieces.

4. A game apparatus comprising a plurality of game pieces mounted for separate movement step by step over a course, mechanism actuated by the player for moving the game pieces one at a time, said mechanism including connected control disks moved by inertia to a set position and having peripheral recesses out of alignment for determining the game piece which is to be moved by an actuation of the operating mechanism by a player and coin controlled devices for initiating the movement of said disks and the actuating mechanism for the game pieces.

5. A game apparatus comprising a plurality of game pieces mounted for independent movement over a course, spring actuated means associated with each game piece, a control disk therefor moved by inertia to a set position and operating to render said spring actuated means operative or inoperative, said control disks being connected and constructed so as to permit the movement of only one game piece at a time, and means operated by the player for retracting the spring actuated means and releasing the same for operation.

6. A game apparatus comprising a plurality of game pieces mounted for independent movement over a course, spring actuated means associated with each game piece, a control disk therefor moved by inertia to a set position and operating to render said spring actuated means operative or inoperative, said control disks being connected and constructed so as to permit the movement of only one game piece at a time, means operated by the player for retracting the spring actuated means and releasing the same for operation, means operating to lock the actuating means in inoperative position, and a coin-controlled means operated by the player for releasing said actuating means.

7. A game apparatus comprising a plurality of game pieces mounted for independent movement over a course, spring actuated means associated with each game piece, a control disk therefor moved by inertia to a set position and operating to render said spring actuated means operative or inoperative, said control disks being connected and constructed so as to permit the movement of only one game piece at a time, a lever adapted to be oscillated by the player, means operated thereby for storing power in said springs and for releasing the spring actuated means for operation, and means operated by said lever for spinning said disks.

8. A game apparatus comprising a plurality of game pieces mounted for independent movement over a course, spring actuated means associated with each game piece, a control disk therefor moved by inertia to a set position and operating to render said spring actuated means operative or inoperative, said control disks being connected and constructed so as to permit the movement of only one game piece at a time, a lever adapted to be oscillated by the player, means operated thereby for storing power in said springs and for releasing the spring actuated means for operation, and devices connected to said lever by the coin for spinning said disks.

9. A game apparatus comprising a plurality of game pieces mounted for independent movement over a course, spring actuated means associated with each game piece, a control disk therefor moved by inertia to a set position and operating to render said spring actuated means operative or inoperative, said control disks being connected and constructed so as to permit the movement of only one game piece at a time, a lever adapted to be oscillated by the player, means operated thereby for storing power in said springs and for releasing the spring actuated means for operation, means operated by said lever for spinning said disks, and means whereby the first game piece to complete the course sounds a signal and initiates the releasing of the game pieces for return to their normal starting position.

10. A game apparatus comprising a plurality of game pieces mounted on a shaft for independent movement thereon, a ratchet connected to each game piece, a holding pawl engaging each ratchet, a feed lever for each ratchet, a feed pawl carried thereby and normally held out of engagement with the ratchet, a spring for each lever for moving the pawl into engagement with the ratchet and for moving the ratchet and game piece one step at a time over said course, a control disk for each feed lever, said control disks being fixed to said shaft and constructed so as to restrain the movement of all of the feed levers except one, means actuated by the player for storing power in said springs and releasing the same for operation, and means actuated by the player for spinning said control disks.

11. A game apparatus comprising a plurality of game pieces mounted on a shaft for independent movement thereon, a ratchet connected to each game piece, a holding pawl engaging each ratchet, a feed lever for each ratchet, a feed pawl carried thereby and normally held out of engagement with the ratchet, a spring for each lever for moving the pawl into engagement with the ratchet and for moving the ratchet and game piece one step at a time over said course, a control disk for each feed lever, said control disks being fixed to said shaft and constructed so as to restrain the movement of all of the feed levers except one, means actuated by the player for storing power in said springs and releasing the same for operation, means actuated by the player for spinning said control disks, and means operated by the winning game piece for operating the signal and for releasing the holding pawls from the ratchets so that the retracting of the feed pawls will release the game pieces for return to their normal starting position.

12. A game apparatus comprising a plurality of game pieces mounted on a shaft for independent movement thereon, a ratchet connected to each game piece, a holding pawl engaging each ratchet, a feed lever for each ratchet, a feed pawl carried thereby and normally held out of engagement with the ratchet, a spring for each lever for moving the pawl into engagement with the ratchet and for moving the ratchet and game piece one step at a time over said course, a control disk for each feed lever, said control disks being fixed to said shaft and constructed so as to restrain the movement of all of the feed levers except one, a lever adapted to be oscillated by the player, means operated on the down-stroke thereof for storing power in said springs and on the up-stroke for releasing said feed levers, and means operated on the down-stroke of said lever for spinning said disks.

13. A game apparatus comprising a plurality of game pieces mounted on a shaft for independent movement thereon, a ratchet connected to each game piece, a holding pawl engaging each ratchet, a feed lever for each ratchet, a feed pawl carried thereby and normally held out of engagement with the ratchet, a spring for each lever for moving the pawl into engagement with the ratchet and for moving the ratchet and game piece one step at a time over said course, a control disk for each feed lever, said control disks being fixed to said shaft and constructed so as to restrain the movement of all of the feed levers except one, a lever adapted to be oscillated by the player, means operated on the down-stroke thereof for storing power in said springs and on the up-stroke for releasing said feed levers, and a coin supporting and connecting means operated on the down-stroke of said lever for spinning said disks.

14. A game apparatus comprising a plurality of game pieces mounted on a shaft for independent movement thereon, a ratchet connected to each game piece, a holding pawl engaging each ratchet, a feed lever for each ratchet, a feed pawl carried thereby and normally held out of engagement with the ratchet, a spring for each lever for moving the pawl into engagement with the ratchet and for moving the ratchet and game piece one step at a time over said course, a control disk for each feed lever, said control disks being fixed to said shaft and constructed so as to restrain the movement of all of the feed levers except one, a lever adapted to be oscillated by the player, means operated on the down-stroke thereof for storing power in said springs and on the up-stroke for releasing said feed levers, a coin supporting and connecting means operated on the down-stroke of said lever for spinning said disks, means for locking the levers out of action, and means actuated by the winning game piece for operating a signal, ejecting the coin from the support and releasing the holding pawls, and means operated on the next down-stroke of the actuating lever for retracting the feed levers, releasing the game pieces and for moving said levers into engagement with the locking means thereof.

15. A game apparatus comprising a plurality of game pieces mounted on a shaft for independent movement thereon, a ratchet connected to each game piece, a holding pawl engaging each ratchet, a feed lever for each ratchet, a feed pawl carried thereby and normally held out of engagement with the ratchet, a spring for each lever for moving the pawl into engagement with the ratchet and for moving the ratchet and game piece one step at a time over said course, a control disk for each feed lever, said control disks being fixed to said shaft and constructed so as to restrain the movement of all of the feed levers except one, a lever adapted to be oscillated by the player, means operated on the down-stroke thereof for storing power in said springs and on the up-stroke for releasing said feed levers, a coin supporting and connecting means operated on the down-stroke of said lever for spinning said disks, means for locking the levers out of action, means actuated by the winning game piece for operating a signal, ejecting the coin from the support and releasing the holding pawls, means operated on the next down-stroke of the actuating lever for retracting the feed levers, releasing the game pieces and for moving said levers into engagement with the locking means thereof, and means operated by the coin supporting means on the next coin actuation thereof for releasing the feed levers.

16. A game apparatus comprising a plurality of game pieces mounted for independent movement over a course, a lever adapted to be oscillated by the player, means actuated thereby for moving said game pieces separately step by step over said course, a vending mechanism associated with said game apparatus, including a magazine for storing checks associated with each game piece, a spring actuated check delivering device for each magazine, a latch for each delivering device for restraining the movement thereof, a latch bar common to all of the delivering devices for restraining the movement thereof, a coin-controlled means associated with each magazine for releasing the latch thereof, means whereby the winning game piece operates on said latch bar to release all of the delivering devices, and means for restoring the delivering devices to initial latched position after release thereby.

GUSTAV F. HOCHRIEM.